United States Patent [19]
Hara

[11] Patent Number: 5,242,868
[45] Date of Patent: Sep. 7, 1993

[54] FLUOROPHOSPHATE GLASS

[75] Inventor: Makoto Hara, Kokubunji, Japan

[73] Assignee: Hoya Corporation, Tokyo, Japan

[21] Appl. No.: 653,742

[22] Filed: Feb. 11, 1991

Related U.S. Application Data

[63] Continuation of Ser. No. 309,359, Feb. 13, 1989, abandoned.

[30] Foreign Application Priority Data

Feb. 29, 1988 [JP] Japan .................................. 63-47118

[51] Int. Cl.$^5$ ............................................. C03C 3/247
[52] U.S. Cl. ......................................... 501/44; 501/904
[58] Field of Search ................................ 501/44, 904

[56] References Cited

U.S. PATENT DOCUMENTS

| | | | |
|---|---|---|---|
| 2,608,490 | 8/1952 | Donahey | 501/44 |
| 3,656,976 | 4/1972 | Izumitani et al. | 501/44 |
| 3,847,624 | 11/1974 | Broemer et al. | 501/44 |
| 4,225,459 | 9/1980 | Faulstich et al. | 501/44 |
| 4,328,318 | 5/1982 | Miranday et al. | 501/44 |
| 4,358,543 | 11/1982 | Nozawa | 501/44 |
| 4,363,879 | 12/1982 | Broemer et al. | 501/44 |
| 4,386,163 | 5/1983 | Kodama | 501/44 |

*Primary Examiner*—Mark L. Bell
*Attorney, Agent, or Firm*—Nixon & Vanderhye

[57] ABSTRACT

The fluorophosphate glass of the present invention comprising $P_2O_5$, metal fluorides which may be partly replaced by metal oxides, and CuO fully satisfies the trasmittance required for a near-infrared absorption filter and has excellent weather resistance allowing for the practical use.

8 Claims, 1 Drawing Sheet

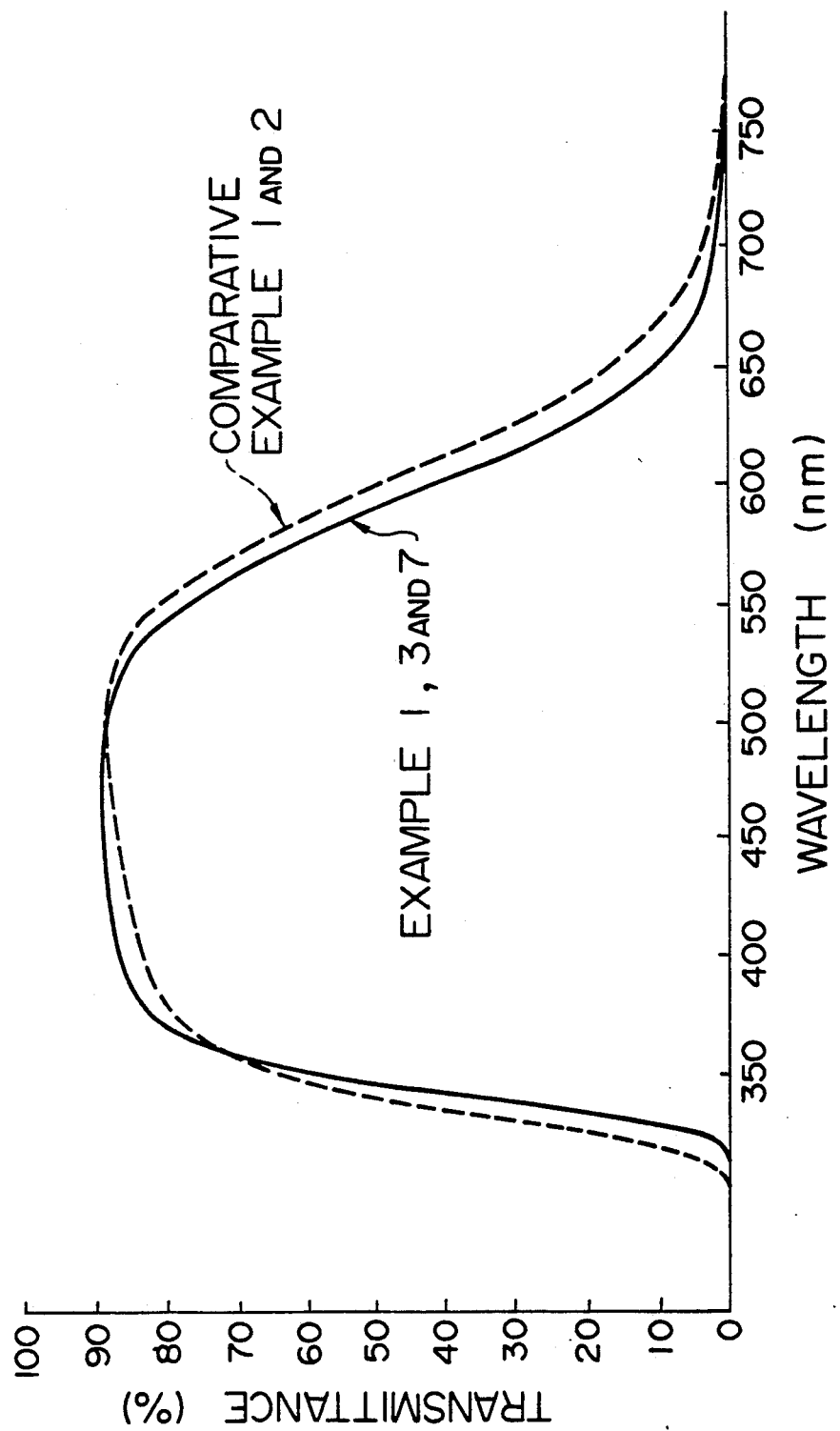

FLUOROPHOSPHATE GLASS

This is a continuation of application Ser. No. 07/309,359, filed Feb. 13, 1989, now abandoned.

BACKGROUND OF THE INVENTION

1. Field of the Invention

The present invention relates to a fluorophosphate glass and more particularly to a fluorophosphate glass suitably used in, for example, a color compensating filter for color VTR cameras.

2. Description of Prior Art

The spectral sensitivity of the pickup tube used in color VTR cameras extends generally from a visible region to a near-infrared region (950 nm). Therefore, unless the near-infrared region is eliminated by the use of a filter and the spectral sensitivity of the pickup tube is simulated to the visual sensitivity of humans, the image obtained has a reddish tone and it is imossible to obtain good color reproduction.

Meanwhile, if the ultraviolet side absorption of the filter used in color VTR cameras extends as far as a visible region, the resulting image is dark. Accordingly, such a filter is required to transmit a light of 400–520 nm as much as possible and to absorb a light of 550–950 nm as much as possible. As such a near-infrared absorption filter, there have conventionally been used CuO-added phosphate glasses.

Phosphate glasses, however, inherently have poor weather resistance. In order to improve the weather resistance of these glasses to a level allowing for their practical use, addition of a relatively large amount of $Al_2O_3$ is necessary, as disclosed in, for example, Japanese Patent Publication No. 128943/1987. This raises a temperature at which the glass materials melt in glass production (the temperature is hereinafter referred to as "glass melting temperature"). A higher glass melting temperature reduces copper more easily. Therefore, di-valent copper ion ($Cu^{2+}$) in glass which shows absorption for near-infrared region is reduced and converted to mono-valent copper ion ($Cu^+$) which shows absorption for ultraviolet region; as a result, the glass has a lower transmittance at a visible light region, a higher transmittance at an infrared region and accordingly deteriorated properties. Meanwhile, in order to improve the transmittance, it is necessary to lower the glass melting temperature by, for example, alkali addition and thereby to prevent the reduction of $Cu^{2+}$ in glass to $Cu^+$. This, however, invites further deterioration of the weather resistance of glass. Thus, in the past production of a near-infrared absorption filter using a phosphate glass, the best compromise of two contradictory properties, i.e. transmittance and weather resistance has been sought so as to allow for the practical use of the produced glass. However, it has been impossible to satisfy both of excellent transmittance and excellent weather resistance.

Hence, the object of the present invention is to provide a glass which fully satisfies the transmittance required for the near-infrared absorption filter used in color VTR cameras and which has excellent weather resistance well allowing for the practical use.

Other objectcs of the present invention will be apparent from the following descriptions.

SUMMARY OF THE INVENTION

The above objects have been achieved by a fluorophosphate glass specified below, comprising $P_2O_5$, metal fluorides which may be partly replaced by metal oxides, and CuO.

The present invention resides in a fluorophosphate glass comprising 5–45% by weight of $P_2O_5$, 1–35% by weight of $AlF_3$, 10–75% by weight of $RF_2$ (R is at least one di-valent metal selected from the group consisting of Ba, Sr, Ca, Mg, Zn and Pb), 0–40% of $R'F$ (R' is at least one mono-valent metal selected from the group consisting of Li, Na and K) and 0–15% by weight of $R''F_m$ ($R''$ is at least one tri- to penta-valent metal selected from the group consisting of La, Y, Gd, Si, B, Zr and Ta and m is a number corresponding to the valence of said metal R''), and further comprising 0.2–15% by weight, based on the total amount of said $P_2O_5$ and said metal fluorides $RF_2$, $R'F$ and $R''F_m$, of CuO.

BRIEF EXPLANATION OF THE DRAWING

FIG. 1 shows the spectral transmittance curves of the glasses of Examples 1, 3 and 7 and Comparative Examples 1 and 2.

DETAILED DESCRIPTION OF THE INVENTION

The role and amount of each component in the fluorophosphate glass of the present invention are described below.

In the fluorophosphate glass of the present invention, $P_2O_5$ is a component which is necessary for the formation of glass network. When the amount of $P_2O_5$ is less than 5% by weight, vitrification is difficult, and when the amount is more than 45% by weight, the resulting glass has low weather resistance. Accordingly, $P_2O_5$ is limited to a range of 5–45% by weight, preferably 10–38% by weight.

$AlF_3$ is a component which is effective for the improvement of weather resistance. When the amount of $AlF_3$ is less than 1% by weight, the addition effect does not appear. When the amount is more than 35% by weight, the resulting glass has low meltability. Accordingly, the $AlF_3$ amount is limited to a range of 1–35% by weight, preferably 1–30% by weight.

$RF_2$ (di-valent metal fluoride) (R is at least one di-valent metal selected from the group consisting of Ba, Sr, Ca, Mg, Zn and Pb) is a component which is effective for the prevention of reduction in weather resistance. When the total amount of $RF_2$ is less than 10% by weight, vitrification is difficult. When the amount is more than 75% by weight, the resulting glass is devitrified easily. Accordingly, the total amount of $RF_2$ is limited to a range of 10–75% by weight, preferably 14–60% by weight. Description is made on each component of $RF_2$. The amount of $BaF_2$ is preferably limited to a range of 0–40% by weight because more than 40% by weight of $BaF_2$ gives a glass of easy devitrification. The amount of $SrF_2$ is preferably limited to a range of 0–40% by weight because more than 40% by weight of $SrF_2$ gives a glass of easy devitrification. The amount of $CaF_2$ is preferably limited to a range of 0–30% by weight because more than 30% by weight of $CaF_2$ gives a glass of easy devitrification. The amount of $MgF_2$ is preferably limited to a range of 0–20% by weight because more than 20% by weight of $MgF_2$ gives a glass of easy devitrification. The amount of $ZnF_2$ is preferably limited to a range of 0–30% by weight because more than 30% by weight of ZnF₂ gives a glass of easy devitrification. PbF₂ is preferably limited to a range of 0–30% by weight because more than 30% by weight of PbF₂ gives a glass of easy devitrification.

R'F (mono-valent metal fluoride) (R' is at least one mono-valent metal selected from the group consisting of Li, Na and K) is a component which is necessary for lowering the melting point and viscosity of the resulting glass. The total amount of R'F is limited to a range of 0–40% by weight, preferably 0–25% by weight because more than 40% by weight of R'F gives a glass of reduced weather resistance. Description is made on each component of R'F. The amount of LiF is limited to a range of 0–20% by weight because more than 20% by weight of LiF gives a glass of reduced weather resitance. The amount of NaF is limited to a ragne of 0–10% by weight because more than 10% by weight of NaF gives a glass of reduced weather resistance. The amount of KF is limited to a range of 0–10% by weight because more than 10% by weight of KF gives a glass of reduced weather resistance.

R''Fm (higher-valent metal fluoride) (R'' is at least one tri- to penta-valent metal selected from the group consisting of La, Y, Gd, Si, B, Zr and Ta and m is a number corresponding to the valence of said metal R'') is a component which improves the weather resistance of the resulting glass without adversely affecting the transmittance of the glass. The total amount of R''Fm is limited to a range of 0–15% by weight because more than 15% by weight of R''Fm gives an unstable glass. The sum of LaF₃ and YF₃ which are higher-valent components is preferably limited to a range of 0–8% by weight because it gives a stable glass.

Up to 70% by weight of the total amount of the metal fluorides RF2, R'F and R''Fm may be replaced by metal oxides. When more than 70% by weight of the total amount of the metal fluorides is replaced by metal oxides, the resulting glass has no excellent weather resistance and transmittance as desired. The amount of the metal fluorides which may be replaced by metal oxides is preferably up to 50% by weight of the total amount of the metal fluorides.

CuO is a component which is essential for the absorption of a near-infrared region. The amount of CuO is determined based on the total amount of $P_2O_5$ and the metal fluorides (part of which may be replaced by metal oxides). The CuO amount is limited to a range of 0.2–15% by weight on the above basis because, when the CuO amount is less than 0.2% by weight, the resulting glass has an insufficient absorbability for near-infrared region and, when the amount more than 15% by weight, the resulting glass is unstable. The CuO amount is preferably in a range of 0.2–13% by weight.

The present invention is described in more detail below by way of Examples.

EXAMPLES 1–16

Total 16 kinds of fluorophosphate glasses all according to the present invention were produced using various glass components. The detail of the production procedure is described below for the fluorophosphate glass of Example 1.

Raw materials (an aqueous orthophosphoric acid solution, aluminum hydroxide, aluminum fluoride, magnesium fluoride, calcium fluoride, strontium fluoride, barium fluoride, lithium carbonate, cupric oxide) were mixed to obtain a mixture comprising (a) basic glass materials consisting of 27.8% by weight of $P_2O_5$, 10.2% by weight of $AlF_3$, 5.3% by weight of $MgF_2$, 10.4% by weight of $CaF_2$, 19.4% by weight of $SrF_2$, 15.0% by weight of $BaF_2$, 7.9% by weight of $Al_2O_3$ and 4.0% by weight of $Li_2O$ and (b) 1.4% by weight, based on the total amount of the basic glass materials (a), of CuO.

The above mixture was placed in a platinum crucible, and the crucible was covered with a lid. The mixture was then melted at 800°–900° C. and stirred for deaeration and homogenization. Thereafter, the melt was cast into a preheated mold and cooled slowly to obtain a fluorophosphate glass of Example 1 having the above composition.

In the same procedure as in Example 1, fluorophosphate glasses of Examples 2–16 were produced. The compositions of the fluorophosphate glasses of Examples 1–16 are shown in Table 1.

Incidentally, in the production of the fluorophosphate glass of the present invention, there may be used, as a raw material, double salts such as aluminum phosphate, barium phosphate and the like.

TABLE 1

| | Examples | | | | | | | | |
|---|---|---|---|---|---|---|---|---|---|
| | 1 | 2 | 3 | 4 | 5 | 6 | 7 | 8 | 9 |
| $P_2O_5$ | 27.8 | 10.0 | 38.0 | 36.5 | 24.3 | 40.0 | 25.6 | 23.0 | 21.8 |
| $AlF_3$ | 10.2 | 27.1 | 1.0 | 2.0 | 14.8 | 1.5 | 9.2 | 8.9 | 12.6 |
| $MgF_2$ | 5.3 | 3.4 | 0.8 | 1.1 | 5.3 | | 13.3 | 4.0 | 6.3 |
| $CaF_2$ | 10.4 | 18.5 | 0.8 | 1.1 | 11.4 | | 9.4 | 11.4 | 13.9 |
| $SrF_2$ | 19.4 | 20.4 | 0.8 | 2.1 | 18.4 | | 17.4 | | 21.5 |
| $BaF_2$ | 15.0 | 13.9 | 1.0 | 3.9 | 25.0 | | 14.0 | 34.4 | 17.9 |
| $ZnF_2$ | | | | | | 26.1 | | | |
| $PbF_2$ | | | 27.0 | 10.0 | | | | | |
| RF2 | 50.1 | 56.2 | 30.4 | 18.2 | 60.1 | 26.1 | 54.1 | 49.8 | 59.6 |
| LiF | | | 7.2 | | | 9.0 | | 5.3 | |
| NaF | | | 1.5 | | | 1.5 | | | |
| KF | | | 1.5 | 3.5 | | | | 5.0 | |
| R'F | | | 10.2 | 3.5 | | 10.5 | | 10.3 | |
| $LaF_3$ | | | | 1.1 | | | | | |
| $YF_3$ | | 3.8 | | 2.1 | | | | | |
| $GdF_3$ | | | | | | | | | |
| $ZrF_4$ | | | | | | | | | |
| $TaF_5$ | | 3.8 | | 3.2 | | | | | |
| R''Fm | | 3.8 | | 3.2 | | | | | |
| (x) | 60.3 | 87.1 | 41.6 | 26.9 | 74.9 | 38.1 | 63.3 | 69.0 | 72.2 |
| $Al_2O_3$ | 7.9 | 0.9 | 5.9 | 4.1 | | 5.1 | 6.1 | 5.0 | 4.5 |
| $Y_2O_3$ | | | | | 0.8 | | | | |
| $SiO_2$ | | | | | | | | | |
| $B_2O_3$ | | | | | | | | | |
| BaO | | | 14.5 | 20.8 | | 16.8 | | | 1.5 |

TABLE 1-continued

|  | 1 | 2 | 3 | 4 | 5 | 6 | 7 | 8 | 9 |
|---|---|---|---|---|---|---|---|---|---|
| CaO | | | | | | | | | |
| MgO | | | | | | | | | |
| La$_2$O$_3$ | | 2.0 | | | | | | | |
| Li$_2$O | 4.0 | | | 8.2 | | | 5.0 | 3.0 | |
| Na$_2$O | | | | 3.5 | | | | | |
| (y) | 11.9 | 2.9 | 20.4 | 36.6 | 0.8 | 21.9 | 11.1 | 8.0 | 6.0 |
| (z) | 16.5 | 3.2 | 32.9 | 57.6 | 1.1 | 36.5 | 14.9 | 10.4 | 7.7 |
| CuO | 1.4 | 12.0 | 1.3 | 7.9 | 0.6 | 3.5 | 1.4 | 5.1 | 6.7 |
| Weather resistance (hrs) | 1080 | 984 | 1032 | 960 | 1008 | 955 | 963 | 955 | 992 |

|  | Examples | | | | | | | Comparative Examples | |
|---|---|---|---|---|---|---|---|---|---|
|  | 10 | 11 | 12 | 13 | 14 | 15 | 16 | 1 | 2 |
| P$_2$O$_5$ | 33.0 | 36.6 | 32.5 | 28.8 | 35.3 | 5.0 | 44.0 | 77.7 | 72.5 |
| AlF$_3$ | 2.0 | 8.7 | 2.0 | 9.4 | 7.0 | 33.5 | 32.5 | | |
| MgF$_2$ | | 4.3 | | 4.1 | 3.7 | 5.1 | 2.0 | | |
| CaF$_2$ | 4.0 | 11.4 | 2.0 | 11.4 | 1.0 | 11.1 | | | |
| SrF$_2$ | 3.0 | 23.0 | 5.0 | 18.4 | 31.0 | 25.9 | 2.7 | | |
| BaF$_2$ | 7.4 | 16.0 | 7.4 | 16.0 | 14.5 | 14.4 | 6.3 | | |
| ZnF$_2$ | | | | | | | | | |
| PbF$_2$ | 14.0 | | 13.0 | | | | | | |
| RF$_2$ | 28.4 | 54.7 | 27.4 | 49.9 | 50.2 | 56.5 | 11.0 | | |
| LiF | 4.0 | | 3.6 | | | | 6.4 | | |
| NaF | | | 2.0 | | | | | | |
| KF | 2.4 | | | | | | | | |
| R'F | 6.4 | | 5.6 | | | | 6.4 | | |
| LaF$_3$ | 2.0 | | | | | | 5.0 | | |
| YF$_3$ | 3.0 | | | | | 3.6 | | | |
| GdF$_3$ | | | 3.5 | | | | | | |
| ZrF$_4$ | | | 5.0 | | 2.0 | | | | |
| TaF$_5$ | | | | | | 1.4 | | | |
| R''F$_m$ | 5.0 | | 8.5 | | 2.0 | 5.0 | 5.0 | | |
| (x) | 41.8 | 63.4 | 43.5 | 59.3 | 59.2 | 95.0 | 54.9 | | |
| Al$_2$O$_3$ | | | | 5.8 | | | | 18.0 | 12.0 |
| Y$_2$O$_3$ | | | | | | | | | 8.9 |
| SiO$_2$ | | | | 0.5 | | | | | |
| B$_2$O$_3$ | | | | 1.1 | | | | | |
| BaO | 21.0 | | 19.0 | | | | | | |
| CaO | | | | | | | | | 6.6 |
| MgO | | | 2.0 | | 0.7 | | | 4.3 | |
| La$_2$O$_3$ | | | | | | | | | |
| Li$_2$O | 4.2 | | 3.0 | 4.5 | 3.7 | | 1.1 | | |
| Na$_2$O | | | | | 1.1 | | | | |
| (y) | 25.2 | | 24.0 | 11.9 | 5.5 | | 1.1 | | |
| (z) | 37.6 | | 35.6 | 16.7 | 8.5 | | 2.0 | | |
| CuO | 9.7 | 1.5 | 2.0 | 2.7 | 1.6 | 2.2 | 1.2 | 2.0 | 2.0 |
| Weather resistance (hrs) | 1015 | 987 | 971 | 1004 | 966 | 1029 | 1000 | 240 | 216 |

Notes
1. The amount of each glass component (P$_2$O$_5$ to CuO) is shown by wt. %.
2. (x), (y) and (z) refer to the followings.
(x) = total fluorides, wt. %
(y) = total oxides (except P$_2$O$_5$), wt. %
(z) = (y)/[(x) + (y)] × 100, %

The above produced fluorophosphate glasses of Examples 1-16 were measured for spectral transmittance. The phosphate glasses of Comparative Examples 1-2 confirming to the phosphate glass described in Japanese Patent Publication No. 128943/1987 which contains P$_2$O$_5$ as a base mateiral and a relatively large amount of Al$_2$O$_3$ but is free from any fluoride, were also measured for spectral transmittance. The former spectral transmittances were compared with the latter spectral transmittances.

As a result, it became clear that the fluorophosphate glasses of Examples 1-16, as compared with the phosphate glasses of Comparative Examples 1-2 containing no fluoride, have a high transmittance at a 360-510 nm wavelength region and a low transmittance (a high absorption) at a wavelength region longer than 510 nm and possess a spectal transmittance suitable for use as a filter for color VTR cameras. For reference, the spectral transmittance curves of the fluorophosphate glasses of Examples 1, 3 and 7 and the phosphate glasses of Comparative Examples 1 and 2 as measured at a glass thickness of 1.6 mm are shown in FIG. 1.

Next, the glasses of Examples 1-16 and Comparative Examples 1-2 were polished and then allowed to stand at about 65° C. at a relative humidity of 90%. The times at which the glass began to show opaqueness at the surface were measured to evaluate their weather resistance.

As a result, the glasses of Comparative Examples 1-2 began to show opaqueness at 240 hours and 216 hours, respectively, and the surfaces completely turned white at about 1,000 hours resulting in the disappearance of glass transparency. In contrast, the glasses of Examples 1-16 began to show opaqueness at about 900-1,100 hours, thus giving very high weather resistance. For reference, the weather resistances (the time at which the glass surface began to show opaqueness) of the glasses of Examples 1-16 and Comparative Examples 1-2 are shown in Table 1.

As described in detail above, there were provided, according to the present invention, fluorophosphate glasses fully satisfying the transmittance required for near-infrared absorption filters and having very high weather resistance.

What is claimed is:

1. A color compensating filter absorbing light in the near infrared region of 550–950 nm and high light transmittance in the range of 400 to 520 nm composed of a fluorophosphate glass consisting essentially of:
   5–45% by weight of $P_2O_5$;
   1–35% by weight of $AlF_3$;
   10–75% by weight of $RF_2$, where R is at least one di-valent metal selected from the group consisting of Ba, Sr, Ca, Mg, Zn and Pb;
   0–40% by weight of $R'F$, whre R' is at least one mono-valent metal selected from the group consisting of Li, Na and K; and
   0–15% by weight of $R''F_m$, where R'' is at least one tri- to penta-valent metal selected from the group consisting of La, Y, Gd, Si, B, Zr and Ta, and m is a number corresponding to the valence of said metal R''; said absorption filter further comprising:
   0.2–15% by weight CuO, based on the total amount of said $P_2O_5$ and said metal fluorides $RF_2$, $R'F$ and $R''F_m$.

2. The color compensating filter according to claim 1 consisting essentially of:
   10–38% by weight of $P_2O_5$;
   1–30% by weight of $AlF_3$;
   14–60% by weight of $RF_2$
   0–25% by weight of $R'F$; and
   0–15% by weight of $R''F_m$; and also containing
   0.2–13% by weight CuO, based on the total amount of said $P_2O_5$ and said metal fluorides $RF_2$, $R'F$ and $R''F_m$.

3. The color compensating filter according to claim 1, consisting essentially of, as $RF_2$, 0–40% by weight of $BaF_2$, 0–40% by weight of $SrF_2$, 0–30% by weight of $CaF_2$, 0–20% by weight of $MgF_2$, 0–30% by weight of $ZnF_2$ and 0–30% by weight of $PbF_2$.

4. The color compensating filter according to claim 1, consisting essentially of, as $R'F$, 0–20% by weight of LiF, 0–10% by weight of NaF and 0–10% by weight of KF.

5. The color compensating filter according to claim 1, wherein the sum of $LaF_3$ and $YF_3$ each as $R''F_m$ is 0–8% by weight.

6. The color compensating filter according to claim 1, wherein up to 70% by weight of the total amount of the metal fluorides is replaced by metal oxides.

7. A color compensating filter according to claim 6, wherein up to 50% by weight of the total amount of the metal fluorides is replaced by metal oxides.

8. A color compensating filter having high transmittance to light in the 360–510 nm wavelength region and low transmittance/high absorption in the wavelength region longer than 510 nm said filter composed of a fluorophosphate glass consisting essentially of:
   5–45% by weight of $P_2O_5$;
   1–35% by weight of $AlF_3$;
   10–75% by weight of $RF_2$, where R is at least one di-valent metal selected from the group consisting of Ba, Sr, Ca, Mg, Zn and Pb;
   0–40% by weight of $R'F$, whre R' is at least one mono-valent metal selected from the group consisting of Li, Na and K; and
   0–15% by weight of $R''F_m$, where R'' is at least one tri- to penta-valent metal selected from the group consisting of La, Y, Gd, Si, B, Zr and Ta, and m is a number corresponding to the valence of said metal R''; said absorption filter further comprising:
   0.2–15% by weight CuO, based on the total amount of said $P_2O_5$ and said metal fluorides $RF_2$, $R'F$ and $R''F_m$.

* * * * *